United States Patent Office 3,532,474
Patented Oct. 6, 1970

3,532,474
PREPARATION OF AZINE FLUORIDE
Vytautas Grakauskas, Arcadia, Calif., assignor to Aerojet-General Corporation, Azusa, Calif., a corporation of Ohio
No Drawing. Original application June 19, 1962, Ser. No. 204,663. Divided and this application July 11, 1968, Ser. No. 796,247
Int. Cl. C01b 21/08; C01c 3/00, 1/02
U.S. Cl. 23—356
1 Claim

ABSTRACT OF THE DISCLOSURE

Preparation of non-ionic inorganic fluoro compounds by direct fluorination of certain ionic, inorganic salts in a moderator selected from a group consisting of lower alkanols, lower alkylene glycols and water.

---

This is a division of application Ser. No. 204,663, filed June 19, 1962, now abandoned.

This invention relates to a novel method of preparing non-ionic inorganic fluoro compounds. This invention further relates to certain novel inorganic compounds.

It is an object of this invention to prepare non-ionic inorganic fluoro compounds in a novel manner. It is another object of this invention to employ novel reaction conditions whereby fluorine groups can be introduced selectively into inorganic compounds. Still another object of this invention is to prepare novel non-ionic inorganic fluoro compounds. These and other objects of this invention will be apparent from the detailed description which follows.

The non-ionic inorganic fluoro compounds are prepared according to the process of this invention by reacting certain ionic inorganic salts with fluorine, the reaction proceeding in accordance with the following general equation:

$$M_uA_v + F_2 \rightarrow F_wA_x + M_yF_z$$

wherein M is a metal cation having a valence of from +1 to +5, and A is an inorganic moiety selected from the group consisting of azide, nitrate, nitrite, isocyanate, chlorate, perchlorate, cyanide, $N_2O_3$, $N_2O_4$, $N_2O_5$ and $N_2O_6$ and $u$, $v$, $w$, $x$, $y$ and $z$ are small whole numbers of from 1 to about 5. Normally in the above equation, $u$ times the valence of M equals $v$ times the valence of A, $w$ times the valence of F equals $x$ times the valence of A and $y$ times the valence of M equals $z$ times the valence of F. However, this is not always the case. Thus, an exception to this general rule may be seen in the case where $M_yF_z$ is mercurous fluoride ($Hg_2F_2$). In the above equation, $F_wA_x$ are the non-ionic fluoro compounds, as is evidenced by their general insolubility in water, and $M_yF_z$ is an ionic by-product.

While not bound by any theory, it appears that in the process of this invention, the diatomic fluorine divides into an anion portion and a cation portion. The cation portion reacts with the anion A to form the compound $F_wA_x$, while the anion portion reacts with cation M to form $M_yF_z$.

Illustrative of the metal cations suitable for use in the above reaction are the metals of Groups I-A and II-A of Period 2, Groups I-A, II-A and III-A of Period 3, Groups I-A, II-A, III-A, IV-A, I-B, II-B, III-B, IV-B, V-B, VI-B, and VII-B of Period 4, Groups I-A, II-A, III-A, IV-A, V-A, I-B, II-B, III-B, IV-B, V-B, VI-B and VII-B of Period 5, Groups I-A, II-A, III-A, IV-A, V-A, VI-A, I-B, II-B, III-B, IV-B, V-B, VI-B and VII-B of Period 6, and all of the elements of Group VIII of the Periodic Table as it appears in the Handbook of Chemistry and Physics, 42nd edition, pages 448 and 449.

Specific examples of such metals are sodium, potassium, ebryllium, magnesium, calcium, barium, titanium, zirconium, tin, lead, vanadium, antimony, bismuth, chromium, molybdenum, tungsten, manganese, iron, cobalt, nickel, platinum, copper, silver, gold, mercury, cadmium, zinc, aluminum, etc.

Preferred metals are those in Periods 2–4, i.e., those elements having atomic numbers 3, 4, 11–13 and 19–32. More preferably, M is an alkali metal cation such as lithium, sodium or potassium.

Illustrative of the compounds which may be fluorinated in accordance with the above reaction are sodium azide, sodium cyanide, potassium nitrate, ferric nitrite, potassium isocyanate, aluminum chlorate, calcium perchlorate, atannous nitrate and barium nitrite.

It should be understood that in the foregoing reaction essentially any inorganic salt which will react with fluorine to form a stable non-ionic inorganic fluoro compound may be used. Thus the compounds specifically enumerated above should be regarded as merely illustrative of the invention.

Typical non-ionic inorganic fluoro compounds which can be prepared according to the process of our invention are azine fluoride, fluorine nitrate, nitryl fluoride, fluoro isocyanate, perchloryl fluoride, fluorine perchlorate, cyanogen fluoride, etc.

Among the compounds having the formula $F_wA_x$, and prepared according to the above-described process of this invention, are novel non-ionic inorganic fluoro compounds having the generic formula $$F_2N_2O_q$$

wherein $q$ is an integer of from 3 to 6 inclusive. These novel compounds have the formulae $F_2N_2O_3$, $F_2N_2O_4$, $F_2N_2O_5$ and $F_2N_2O_6$.

These compounds are prepared according to the process of this invention by reacting fluorine with compounds of the formula $$M_2N_2O_q$$

wherein M and $q$ are as previously defined.

The aforementioned reactions of this invention are carried out in a substantially inert moderater. The term "substantially inert" is used throughout the specification and claims and is intended to include any moderator which is less reactive with fluorine than the inorganic salts $M_uA_v$ being fluorinated.

The most suitable substantially inert moderators are those which are less than one-quarter as reactive with fluorine as are the salts $M_uA_v$. The moderator of this invention is any polar or non-polar material in which the inorganic salt $M_uA_v$ being fluorinated is at least partially soluble. Thus the moderator may be a complete solvent for the material being fluorinated. Likewise, the moderator may be a material in which the inorganic salt forms only a partial suspension. Preferably, although not necessarily, the salt $M_uA_v$ is soluble in the moderator at least to the extend of 1 part by weight per 100 parts by weight of moderator. Use of the moderator is an essential part of the fluorination reaction of this invention. The moderator serves not only as a carrier for the reaction but is also essential to the controlled fluorination of the inorganic salt.

I am not certain as to the exact mechanism by which the moderators control the fluorination. However, the moderator is known to serve as more than a carrier for the reaction since omission of the moderator results in rapid random fluorination of the salt, leading to extensive decomposition and contamination of the ultimate product. Further, the moderator promotes selective fluorination, i.e., the fluorination will occur only at the most reactive site in the inorganic salt.

The specific moderator chosen is not critical, and its selection depends upon such factors as cost, availability, inertness and solvent characteristics.

The preferred moderators are those polar and non-polar materials which are liquids within the temperature range of about −40° C. to about +40° C. This does not mean that my moderators must be liquid throughout this entire range. Rather, my preferred moderators are liquid over at least some portion of this range; that is, they have a normal melting point either below or within this range.

Typical of the types of moderators suitable in the practice of this invention are the hydrocarbon alkanes and especially the hydrocarbon alkanes having from 5 to about 10 carbon atoms, such as pentane, hexane, octane, nonane and decane. Another group of suitable moderators are the haloalkanes having from 1 to about 8 carbon atoms such as methylene dichloride, ethylene chloride, chloroform and carbon tetrachloride. Still another class of moderators are the aromatic hydrocarbons having from 6 to about 12 carbon atoms such as benzene, toluone, the otho, meta and para isomers of xylene. The chlorinated aromatic hydrocarbons containing 6 to 12 carbon atoms may also be used. Illustrative of these are monochlorobenzene and chlorotoluene.

Other suitable moderators include the aliphatic ketones, having the formula

the ethers having the formula

R—O—R and the dialkyl substituted amides having the formula

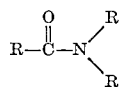

wherein in the above formula the R groups are alkyl, and preferably lower alkyl having from 1 to about 8 carbon atoms such as methyl, ethyl, pentyl and octyl. Specific ketones include dimethyl ketone, diethyl ketone and methyl, ethyl ketone. The ethers include dimethyl ether, diethyl ether and diisopropyl ether. The substituted amides include dimethyl formamide, diethyl formamide and dimethyl acetamide.

Still other moderators are water, the lower alkanols having from 1 to about 6 carbon atoms and the lower alkylene glycols having from 1 to about 6 carbon atoms. Suitable lower alkanols and alkylene glycols include methanol, ethanol, isopropanol, ethylene glycol, propylene glycol and butylene glycol.

Preferred among the foregoing moderators are the polar solvents such as water, the lower alkanols and lower alkylene glycols.

It is to be understood that mixtures of any of the foregoing moderators may be employed in the practice of this invention. Water is the preferred moderator because of its low cost and ready availability. However, lower aliphatic alcohols such as methanol, ethanol, and isopropanol have been found to give very good results. It is surprising that the fluorination reaction can be carried out in lower aliphatic alcohols since the introduction of fluorine into the low aliphatic alcohol would normally be expected to cause fires and explosions. Fluorination reactions in this invention were found to proceed very satisfactorily in the lower aliphatic alcohols.

The amount of the moderator employed is not critical. Normally the weight ratio of moderator to the ionic salt being fluorinated is within the ratio from about 0.5 to 200, and more preferably within the range from about 1.0 to about 20.

The temperature at which these fluorination reactions can be carried out is not critical. Normally it is desirable to keep the temperature as low as possible in working with fluorine. Thus the preferred reaction temperature is between about −40° C. to about +40° C. More preferably, the fluorination reaction is carried out between the temperatures of about −5° C. and +5° C.

The fluorine gas used in this invention can sometimes be diluted with an inert gas such as helium or nitrogen so as to improve the control of the rate of fluorine addition.

In the fluorination reactions of this invention proportions of the reactants may be varied over a wide range. Normally the inorganic salt and fluorine should be used in approximately stoichiometrically equivalent amounts since the use of excessive fluorine can cause extensive reaction with the moderator resulting in undesirable contamination of the desired non-ionic inorganic fluoro compound.

Many of the inorganic non-ionic fluoro compounds of this invention ($F_wA_x$) are gases, and are isolated by collection in a cold trap or series of such traps in a conventional manner.

The fluorinations of this invention may be carried out in any conventional reactor. However, for long reactor life, those portions which can come in contact with fluorine should be coated with a material such as nickel or polyethylene.

The inorganic fluoro compounds produced according to this invention which are non-gaseous may be isolated from the reaction medium in conventional manner, i.e., by filtration, crystallization, extraction and/or distillation.

Fluorination reactions of this invention may be carried out under any suitable pressure. Normally atmospheric pressure is used since it is most convenient. However it may be sometimes desirable to conduct the fluorination under elevated pressure in order to increase the solubility of the fluorine in the moderator. In other cases it may be desirable to operate the process at reduced pressure so as to facilitate the removal of the gaseous product. Thus the operator may vary the pressure to suit the particular moderator and ionic material, $M_uA_v$, being fluorinated.

The examples which follow are presented only for purposes of illustration and should not be regarded as limitative of the scope of my invention in any way. In the examples percentages are by weight unless otherwise indicated.

EXAMPLE I

Preparation of azine fluoride

A vessel was fitted with gas input and output lines, and a temperature controller device. A stream of fluorine (1–2 liters per hour) diluted with helium (10 liters per hour) was passed at 5–10° C. with stirring into the vessel containing a solution of 5.0 grams of sodium azide in 30 ml. water. The reaction was continued for a period of 10 minutes and then a sample of the gas stream escaping from the reaction mixture was trapped in an evacuated container. Infrared spectrum analysis of this gas showed it to be azine fluoride.

EXAMPLE II

Preparation of cyanogen fluoride

Sodium Cyanide was fluorinated following the reaction conditions described in Example I, using water as the moderator. The infrared spectrum analysis of the gas produced in this reaction showed the product to be cyanogen fluoride.

When the foregoing example is repeated, using potassium isocyanate in lieu of sodium cyanide, fluoro isocyanate is obtained in good yield.

EXAMPLE III

Preparation of $F_2N_2O_3$

Following the conditions of Example I, $K_2N_2O_3$ is fluorinated, using hexane as the moderator. The infrared spectrum analysis of the product shows it to be $F_2N_2O_3$.

When the above Example is repeated, using $Li_2N_2O_4$, $Fe_2(N_2O_5)_3$ and $Al_2(N_2O_6)_3$ in lieu of $N_2N_2O_3$: $F_2N_2O_4$, $F_2N_2O_5$, and $F_2N_2O_6$, respectively, are obtained in good yield.

When $K_2N_2O_3$ is fluorinated, using first benzene and then dimethyl acetamide as the moderator, in place of hexane, satisfactory results are obtained.

EXAMPLE IV

Preparation of nitryl fluoride

A stream of fluorine (1–2 liters per hour) diluted with helium (10 liters per hour) is passed at about 0–15° C. into a solution of 5 grams of potassium nitrite in about 100 ml. of ethanol. The reaction is continued for a period of about 10 minutes. The product is collected in a cooled evacuated container. Analysis of this product shows it to be nitryl fluoride.

When the foregoing example is repeated, using methanol and ethylene glycol, respectively, as the moderator, similar results are obtained.

When the proceeding example is repeated, using magnesium nitrate in lieu of potassium nitrite, and dimethyl acetamide, as the moderator, fluorine nitrate is obtained in good yield.

EXAMPLE V

Preparation of perchloryl fluoride

Potassium chlorate was fluorinated following the reaction conditions described in Example I. Water was used as the moderator. The infrared spectrum analysis of the gas produced in this reaction showed it to be identical with the infrared spectrum of a sample of commercial $FClO_3$.

When Example V is repeated, using dimethyl ketone in lieu of water as the moderator, perchloryl fluoride is again obtained in good yield.

EXAMPLE VI

Preparation of fluorine perchlorate

One part of nickel perchlorate is added to about 15 parts of diethyl ether. Fluorination is carried out under the conditions set forth in Example I. Infrared analysis of the isolated product produced showed it to be fluorine perchlorate.

When the foregoing example is repeated, using carbon tetrachloride rather than diethyl ether as the moderator, fluorine perchlorate is obtained in good yield.

In the preparation of the inorganic fluoro compounds of this invention, it is sometimes desirable to agitate the ingredients so as to insure more complete contact and thus improve the rate of reaction. Agitation is especially desirable in those cases where the ionic material being fluorinated is only partially soluble in the moderator.

The inorganic fluoro compounds produced according to this invention which contains energetic groups such as the nitrate group, perchloryl group, etc., are inherently useful as explosives. In addition, the novel compounds of the formula $F_2N_2O_q$ produced according to this invention find application as high energy components in rocket fuel formulations. For example, these compounds are useful as oxidizers for liquid rocket fuels such as hydrazine. Compounds such as perchloryl fluoride are well known, and are used commercially as fluorinating agents.

It will be understood that various modifications may be made in this invention without departing from the spirit thereof or the scope of the appended claim.

I claim:

1. The method of preparing azine fluoride which comprises reacting an alkali metal azide compound with fluorine in the presence of water.

References Cited

Mellor: Comprehensive Treatise on Inorganic and Theoretical Chemistry, vol. 8 (1928), pp. 336 and 337.

OSCAR R. VERTIZ, Primary Examiner.

H. S. MILLER, Assistant Examiner.

U.S. Cl. X.R.

23—203, 359; 149—35, 109